United States Patent [19]
Hord

[11] 3,934,904
[45] Jan. 27, 1976

[54] TRIPLE NIPPLE

[76] Inventor: Joseph B. Hord, 312 W. Saunders, Maxton, N.C. 28364

[22] Filed: Nov. 5, 1974

[21] Appl. No.: 521,235

[52] U.S. Cl. ............... 285/158; 285/253; 285/404
[51] Int. Cl.² ......................................... F16L 41/00
[58] Field of Search ........... 285/158, 205, 218, 404, 285/195, 192, 253

[56] References Cited
UNITED STATES PATENTS

| | | | |
|---|---|---|---|
| 839,947 | 1/1907 | McCluskey | 285/404 X |
| 1,369,390 | 2/1921 | Brons | 285/158 X |
| 2,025,904 | 12/1935 | Ruck | 285/158 |
| 2,052,394 | 8/1936 | Fullman | 285/205 X |
| 2,180,960 | 11/1939 | Kennedy | 285/192 |
| 3,136,570 | 6/1964 | Lee | 285/404 X |
| 3,643,987 | 2/1972 | Dupont | 285/205 |

FOREIGN PATENTS OR APPLICATIONS 6,703,490   9/1968   Netherlands.................... 285/158

*Primary Examiner*—Thomas F. Callaghan
*Attorney, Agent, or Firm*—Clarence A. O'Brien; Harvey B. Jacobson

[57] ABSTRACT

A sealing means for attaching a conventional garden hose to a 55 gallon drum, or similar container, having a plurality of nestingly interrelated parts to ensure easy and rapid sealing connection of the hose to the drum. A flared sleeve is positioned through an aperture in a wall of the drum, annular means are provided on both sides of the drum wall adjacent the aperture, and a plurality of Allen screws secure the various parts in sealing relationship. Conventional garden hose clamp means are used to clamp a garden hose to the exteriorly protruding portions of the sealing means.

2 Claims, 3 Drawing Figures

U.S. Patent   Jan. 27, 1976   3,934,904
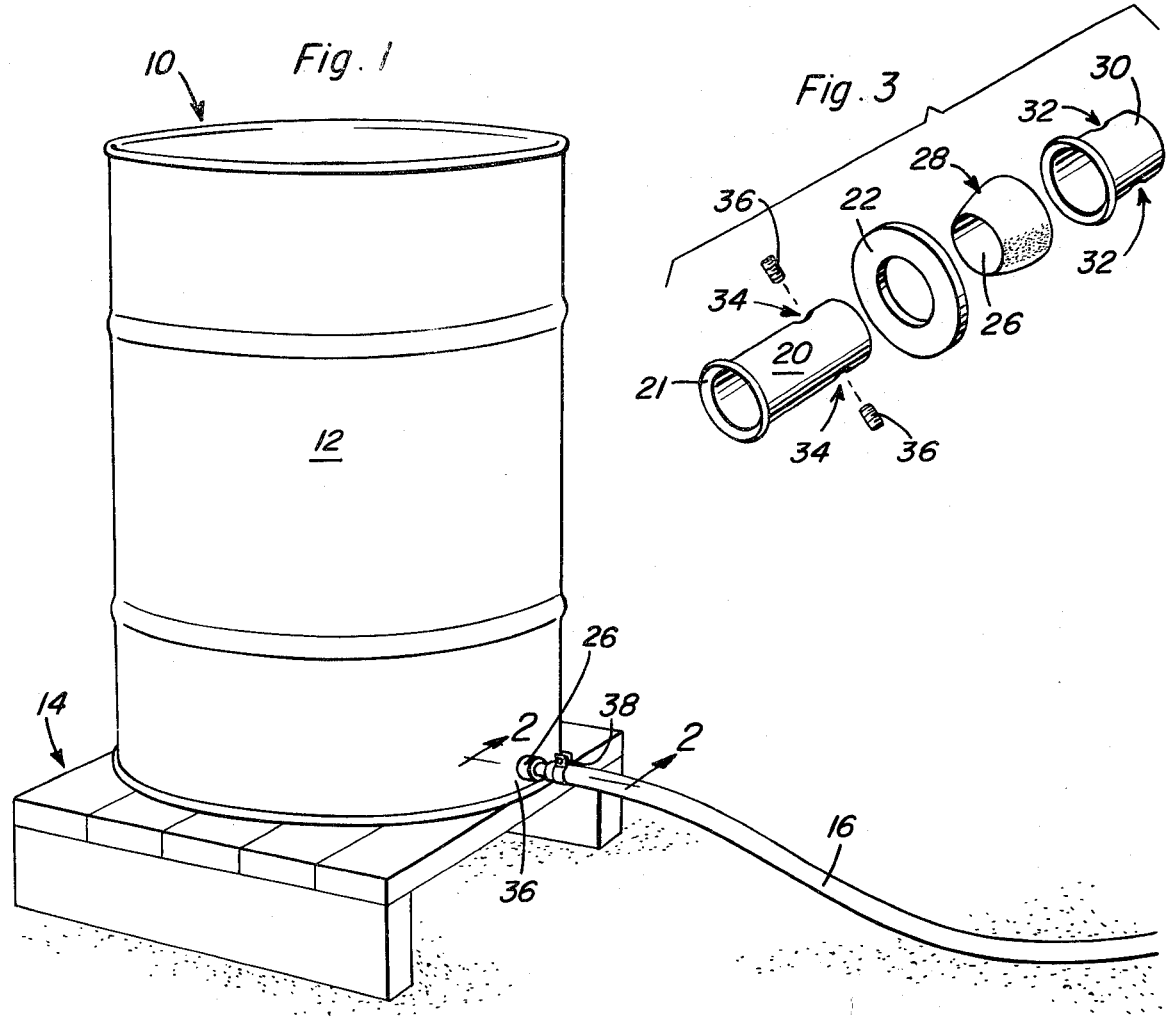
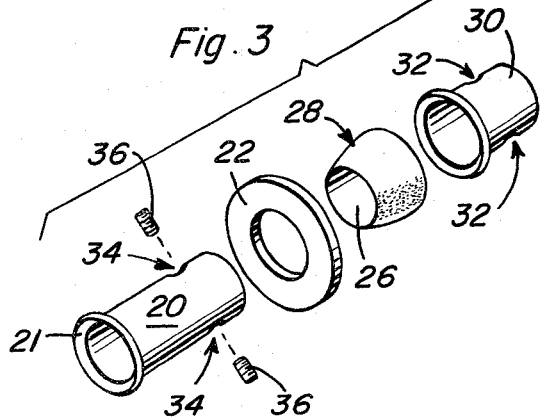
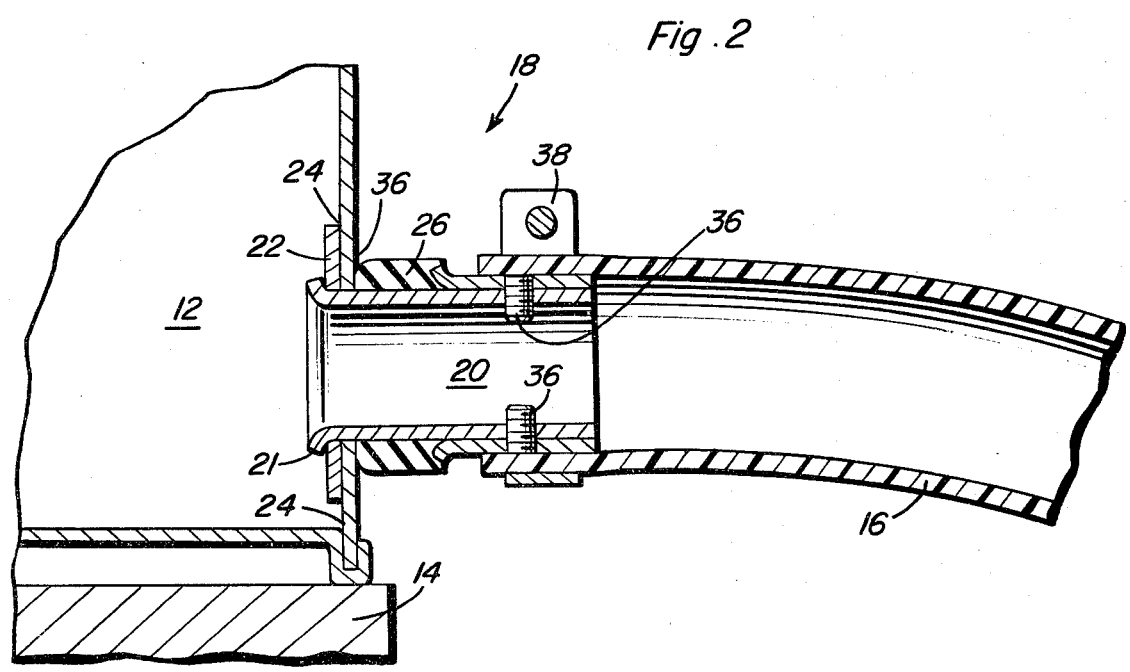

TRIPLE NIPPLE

BACKGROUND OF THE INVENTION

The following prior U.S. patents are believed to be exemplary of prior activity in this field of endeavor: the Baldwin U.S. Pats. (No. 1,885,042, issued Oct. 25, 1932) and Burvenick (No. 1,896,028, issued Jan. 31, 1933) patents disclose metal-to-metal sealing contacts including overlapping members; the Kennedy (No. 2,180,960, issued Nov. 21, 1939) patent discloses the use of a cementitious material to first act as a lubricant and then harden to accomplish the sealing function, U.S. Pat. Nos. the Krohm (No. 2,793,912, issued May 28, 1957) patent discloses a sealing arrangement whereby a nozzle means may be rotationally re-positioned after sealing is attained; and, the Mullings (U.S. Pat. No. 3,486,523, issued Dec. 30, 1969) patent discloses shaped sealing means positionable in one of a plurality of apertures in a given container.

SUMMARY OF THE INVENTION

Among the objects and advantages of my invention are the following:

1. To provide an inexpensive kit to a purchaser that will assure him of strong sealing contact when he attaches a garden hose to a drum or similar container.

2. To provide a flared sleeve, flat annular member, conical gasket, and second sleeve means fixable in position by fastening means to provide a sealed coupling for a hose to a drum.

3. To further provide a pair of Allen-screws threadable into mating apertures in the respective sleeve means to accomplish the desired seal.

4. To also provide in the purchaser's kit a conventional garden hose clamp to provide a complete "package" with all necessary items.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a drum and hose attached together in an "in use" position.

FIG. 2 is a cross-sectional view, on an enlarged scale, showing the positions of the various parts in their "use" positions.

FIG. 3 is a similarly enlarged exploded view of the various sleeve, annular members, and fastening means, showing their direction and order of assembly.

DETAILED DESCRIPTION OF THE INVENTION

In the drawings, reference numeral 10 denotes the overall device in an "in use" position. A 55 gallon barrel, or similar container, is represented by reference character 12, supported by a platform 14, or comparable support. A conventional garden hose, or similar hose means, is denoted by 16. My device, in general, is referenced by 18 in FIG. 2.

In the connected view of FIG. 2, and in the exploded view of FIG. 3, the parts are denoted as follows:

20 is a flared tubular sleeve which is preferably of metal, but could be made of a strong plastic, or similar material.

22 is an annular member fitting between the flared end 21 of sleeve 20, and an interior wall portion 24 of drum 12. This annular member may be of conventional design with appropriate sealing qualities.

26 is a smooth bored, elongated gasket, preferably of rubber or of a plastic of rubbery consistency. The smooth bore snugly receives the outside diameter of sleeve 20. The exterior of 26 (as best seen in FIG. 3) has a generally conically-tapered exterior, 28, with the taper pointing toward the flange 21 of 20, in use.

30 represents a second sleeve means which, as illustrated, is also flanged; however, this second sleeve 30 need not be flanged, as will be readily apparent from the additional fastening means described below.

Sleeve 30 has a plurality of threaded apertues, 32-32, preferably two diametrically located apertures, as illustrated in FIGS. 2 and 3, which, when in use, mate with two diametrically located threaded apertures, 34-34, in sleeve 20. Allen type setscrews 36-36 are threaded through the threaded apetures 32 and 34 when my device is in the "in use" position. Further, the location of the respective pairs of threaded apertures is such that 20 and 30 must be forced together, to align these threaded apertures 32 and 34; and, in so doing, the tapered gasket 26 is "squeezed" therebetween, thus forcing a sealing fit against an exterior wall portion 36 of drum 12.

A conventional hose clamp, shown at 38 in each of FIGS. 2 and 3, may be used to affix a garden hose, or other hose means, 16, to my attachment device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a container having an opening in the peripheral wall thereof, a flexible hose, and a nipple connecting the hose to the container, said nipple comprising an inner cylindrical sleeve extending through the opening and having an outwardly flared inner end disposed interiorly of the container, an annular seal member interposed between the flared end of the inner sleeve and the container in peripherally enclosing relation to the opening for sealing the inner sleeve with respect to the opening, an outer cylindrical sleeve telescoped over the inner sleeve and disposed externally of the container, an elongated gasket of resilient material encircling said inner sleeve and disposed between the outer surface of the wall of the container and the outer sleeve, each of said sleeves having radial screw threaded openings therethrough, set screws threaded through said openings in the sleeves and maintaining the sleeves in predetermined longitudinal relationship, the length of said gasket being normally greater than the distance between the container and the inner end of said outer sleeve when the set screws are positioned through the openings whereby the gasket is maintained in compressed condition in sealed relation to the wall of the container peripherally of the opening, said hose being telescoped over and secured to the outer sleeve.

2. The combination as defined in claim 1 wherein the outer ends of the sleeves coincide, said hose overlying the openings and set screws for concealing same, and a hose clamp encircling the hose and disposed in overlying relation to the openings and set screws to retain the set screws in place.

* * * * *